United States Patent [19]

Mikiya et al.

[11] 4,456,410

[45] Jun. 26, 1984

[54] STABILIZATION DEVICE FOR THE STAND OF A DRILLING MACHINE

[75] Inventors: Toshio Mikiya; Mitihiro Shoji; Tadao Tanoi, all of Tokyo, Japan

[73] Assignee: Nitto Kohki Company, Limited, Tokyo, Japan

[21] Appl. No.: 296,357

[22] Filed: Aug. 26, 1981

[30] Foreign Application Priority Data

Sep. 4, 1980 [JP] Japan .......................... 55-125036[U]
Sep. 25, 1980 [JP] Japan .......................... 55-135392[U]

[51] Int. Cl.³ ........................ B23B 39/14; B23B 45/14
[52] U.S. Cl. .......................................... 408/76; 408/4
[58] Field of Search ................... 408/72 R, 76, 77, 78, 408/79, 85, 86, 13, 9, 8, 135, 710, 4; 409/175, 178; 269/8

[56] References Cited

U.S. PATENT DOCUMENTS

| | | | |
|---|---|---|---|
| 2,813,445 | 11/1957 | Twamley et al. | 408/4 |
| 4,261,673 | 4/1981 | Hougen | 408/76 |
| 4,278,371 | 7/1981 | Meyer | 408/76 |

*Primary Examiner*—Z. R. Bilinsky
*Assistant Examiner*—Thomas Kline
*Attorney, Agent, or Firm*—Wenderoth, Lind & Ponack

[57] ABSTRACT

A stabilization device for the stand of a drilling machine which comprises a casing secured to the rear of the stand and having a vertical stepped opening and a horizontal opening intersecting the vertical opening at right angles, a punch received in the casing for upward and downward movement and having a pointed projection extending downwardly from the lower end of the punch, a compression spring received in the casing to normally bias the punch downwardly and a spring loaded stop normally biased into the horizontal opening.

6 Claims, 6 Drawing Figures

STABILIZATION DEVICE FOR THE STAND OF A DRILLING MACHINE

BACKGROUND OF THE INVENTION

This invention relates to a drilling machine and more particularly, to a stabilization device for the stand of the drilling machine.

There have been proposed and practically employed a variety of stabilization devices for the stand of a drilling machine. There has been known an electromagnet base drilling machine (which will be referred to simply as a "drilling machine" hereinafter) in which an electric drill is mounted on the front of the stand of the machine for upward and downward movement relative to the stand and an electromagnet is attached to the underside of the stand for electromagnetic adherence to work which is to be processed by the drilling machine so that a drilling operation can be promptly performed. The drilling machine is illustrated in FIG. 6 of the accompanying drawings. In operation, first of all, a stabilization means 2 in the form of a threaded bolt screwed in the rear of the stand 1 is adjusted to a height suitable for a particular drilling operation to be performed, the switch for the electromagnet 4 is actuated to energize the electromagnet which in turn electromagnetically adheres to the work 5, the motor for the electric drill 6 is actuated to operate the drill 6 and finally, the electric drill 6 is gradually lowered by hand until a cutter attached to the lower end of the drill abuts against the work 5. In this operation, the energization of the electromagnet and the operation of the electric drill, which are not related to each other, have to be performed separately, and thus the preparation procedure prior to actual drilling referred to above is time consuming and tediuos, resulting in inefficient operation of the drilling machine. Furthermore, there is the possibility that a wrong switch or switches will be actuated. In addition, when a high torque is applied to the electric drill during a drilling operation on the drilling machine, the entire drilling machine tends to swing about the electric drill. In order to prevent the drilling machine from swinging, it has been proposed to employ an additional step to cause the tip of the punch to bite into the work, but the employment of the additional step complicates the operation and makes it further inefficient.

SUMMARY OF THE INVENTION

Therefore, the present invention is to provide a novel and improved stabilization device for the stand of a drilling machine which can effectively eliminate the disadvantages inherent in the conventional stabilization devices for the stand of a drilling machine.

The purpose of the present invention is to provide a stabilization device for the stand of a drilling machine in which a manual lever and an electric circuit are operated stepwise, a pointed projection extending downwardly from the lower end of a punch is driven so as to bite a work under the action of a spring whereby the stand of the drilling machine is stabilized against movement and/or displacement and thus, a drilling operation can be easily and safely performed.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

PREFERRED EMBODIMENTS OF THE INVENTION

Figure 1:
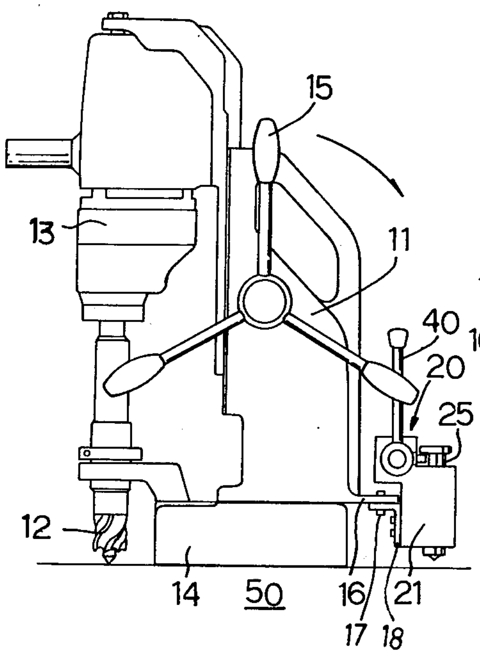
FIG. 1 is a side elevational view of a drilling machine with which a first embodiment of stand stabilization device of the present invention is employed.

The present invention will be now described referring to the accompanying drawings and more particularly, to FIGS. 1 to 5 inclusive in which the first embodiment of the present invention is shown. The stand of a drilling machine is generally shown by reference numeral 11 and an electric drill 13 is mounted on the front of the stand for vertical movement. An electromagnet 14 is attached to the underside of the stand 11 and the stand stabilization device 20 which constitutes the subject matter of the present invention and of which description will be made hereinafter is connected to the rear of the stand 11. Reference numeral 15 denotes an operation handle mounted on one side of the stand 11 for moving the electric drill 13 upwardly and downwardly.

The stand stabilization device 20 generally comprises a mounting position 18 directly and indirectly connected to a projection 16 extending rearwardly from the rear of the stand 11 by means of conventional fasteners such as bolts 17 (only one bolt 17 is shown) or the like and a casing 21 secured to the mounting portion 18 by means of suitable fasteners such as bolts **17*a* and having a vertical through stepped opening 22. The opening 22 is formed at an intermediate point between the upper and lower ends with a shoulder 23 which divides the opening 22 into a larger diameter lower portion 24 and a smaller diameter upper portion 24*a*. Vertically movably received in the stepped opening 22 in the casing 21 is a punch 25 which has an enlarged diameter engaging head 25' secured to the upper end thereof by means of a pin (not shown) and the punch 25 is formed at the lower end thereof with an enlarged diameter portion 26 having a pointed projection 27** extending downwardly from the undersurface of the enlarged diameter portion.

Reference numeral 28 denotes a strong compression spring extending between the shoulder 23 on the opening 22 and the punch enlarged diameter portion 26 to normally bias the punch 25 downwardly and reference numeral 30 denotes a stop extending through a horizontal opening 31 formed in an upper portion of the casing 21 at right angles to the stepped opening 22 in a position above the shoulder 23. The leading end of the stop 30 is adapted to engage an annular recess **25*a* formed in the outer periphery of the punch 25 and the stop is formed adjacent to and inwardly from the leading end with a spring engaging or enlarged diameter portion 32. The horizontal opening 31 is threaded at the entrance thereof and an externally threaded engaging ring 33 is screwed in the threaded opening entrance. A compression spring 34 extends between the engaging portion 32 and engaging ring 33 to normally bias the stop 30 forwardly. The stop 30 further has a head 35** secured thereto by a suitable fastener (not shown).

Reference numeral 36 denotes a pair of spaced attachment plates integrally formed at the top of the casing 21 leaving a space 37 therebetween for the purpose to be described hereinafter and the attachment plates have aligned center holes through and in which a horizontal shaft 38 extends and is journalled. A boss 39 is formed at one end of the shaft 38 and has a manual lever 40 secured thereto and the other end of the shaft 38 is connected to a rotary switch or any known switch 41 which is adapted to control a power source electrical circuit to the electric drill 13 and an electromagnet 14.

A sleeve 42 is mounted on the shaft 38 in the space 37 and has a radially extending projection 43 disposed at right angles to the axis of the manual lever 40. The projection 43 is adapted to alternately engage the head 25' of the punch 25 and the head 35 on the stop 30 as the shaft 38 rotates. The portion of the upper surface of the casing 21 positioned in the clearance 37 is chambered at 29 so that the radial projection 43 can move without being interfered with by the casing 21.

Figure 5:
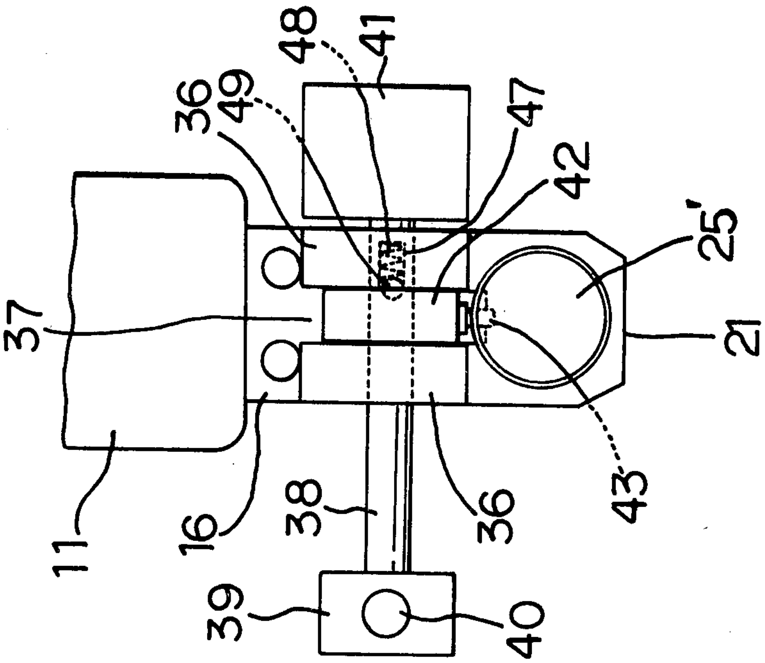
FIG. 5 is a fragmentary plan view of the stabilization device.
Figure 6:
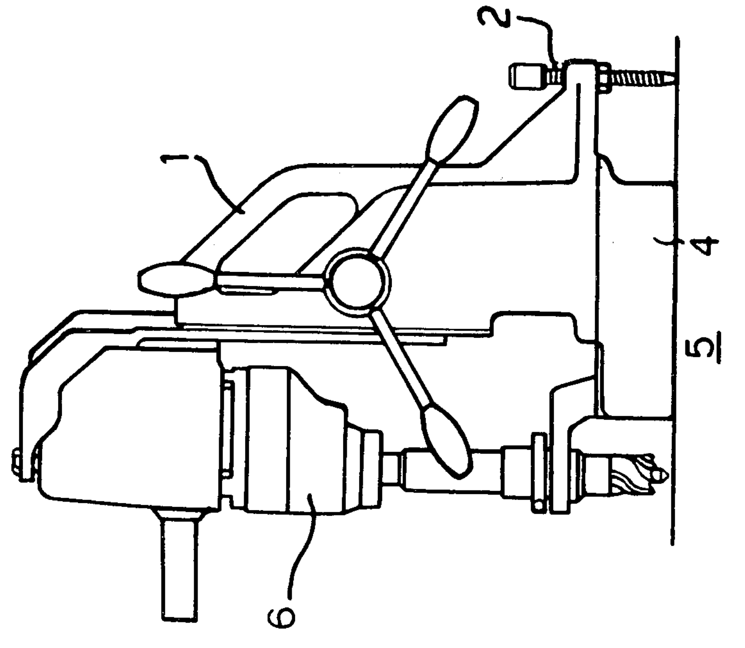
FIG. 6 is a side elevational view of a conventional drilling machine showing the machine together with a conventional stabilization device.

Reference numerals 44, 45 and 46 denote semispherical recesses formed in one side surface of the sleeve 42 mounted on the shaft 38 at the angular distance of 45° about the axis of the sleeve and the opposing surface of one of the pair of attachment plates 36 (the right-hand attachment plate as seen in FIG. 5) is formed with a blind hole 47 in which a compression spring 48 and a stop ball 49 are received in such a manner that the stop ball 49 is caused to engage in the semi-spherical recesses 44, 45, 46 in succession as the manual lever 40 is rotated whereby the manual lever 40 can be positively operated step by step. The stepwise operation of the manual lever 40 allows the opening and closing of the power source circuit to the electric drill 13 and electromagnet 14 and the locking and release of the punch 25 and stop 30 to be performed step by step.

Figure 2:
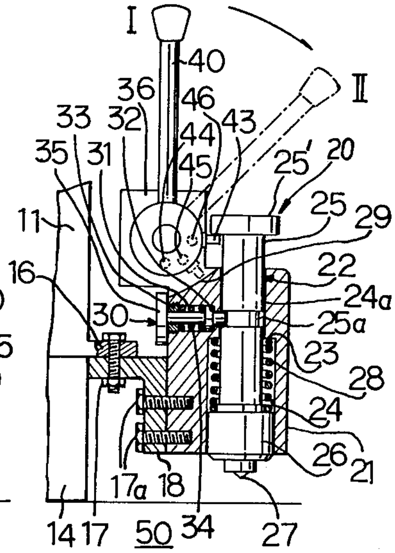
FIG. 2 is a fragmentary view in partial section of the drilling machine which shows the punch of the stabilization device in its raised or inoperative position.
Figure 3:
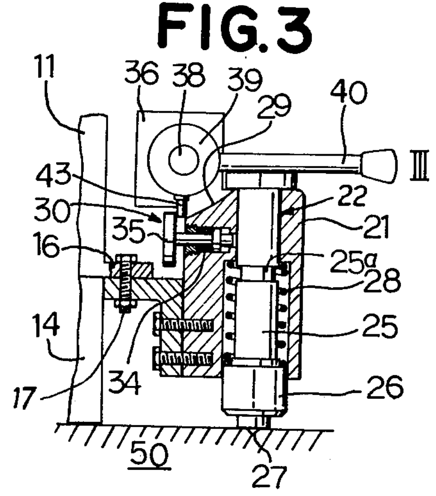
FIG. 3 is similar to FIG. 2, but shows the punch in its lowered or operative position.

In operation, even when an electric cord (not shown) connected to the stand 11 is connected to the power source, if the manual lever 40 is in the upright position 1 as shown in FIG. 2, the switch 41 is not actuated and thus, the electromagnet 14 and electric drill 13 are not supplied electric current thereto. When the manual lever 40 is rotated from the position I to the position II as shown in FIG. 2 which is at 45° with respect to the upright position I, although the punch 25 remains in the same position as that in which the punch assumes when the manual lever 40 is in the upright position I, the projection 43 on the sleeve 42 disengages from the engaging head 25' on the punch 25 and at the same time, the switch 41 is actuated to allow electric current to flow to and through the electromagnet 14 to excite the electromagnet whereby the electromagnet attractively engages a work 50 such as an iron plate, for example, positioned under the drilling machine to hold the work down. Thereafter, when the manual lever 40 is further rotated from the position 11 to the position 111 as shown in FIG. 3 which is at 90° with respect to the upright position I, the stop 30 is retracted from within the horizontal opening **25*a* in the punch 25 by the sleeve projection 43 against the force of the spring 34 and thus, the punch 25 is abruptly pushed downwardly under the force of the spring 28 whereby the pointed projection 27 bites the work 50 to further stabilize the drilling machine stand. In the position III of the manual lever 40, the switch 41 also turns the electric circuit to the electric drill 13 on to thereby rotate the cutter 12 ready for drilling operation while maintaining the electromagnet 41 in its excited condition. In order to perform the drilling operation, the electric drill 13 is lowered by rotating the manual handle 15 in the direction of the arrow as shown in FIG. 1. When the cutter 12 abuts against the work 50, the reaction force of the drill 23 tends to lift the front part of the electromagnet 14 on one hand and a torsional torque is generated at the tip of the cutter 12 to cause the stand 11 to move horizontally on the other hand. However, according to the present invention, since the pointed projection 27 on the punch 25 bites the work 50 during the drilling operation, the punch 25 is held against displacement and/or movement about on the work 50** in the horizontal direction to thereby stabilize the drilling machine stand.

Figure 4:
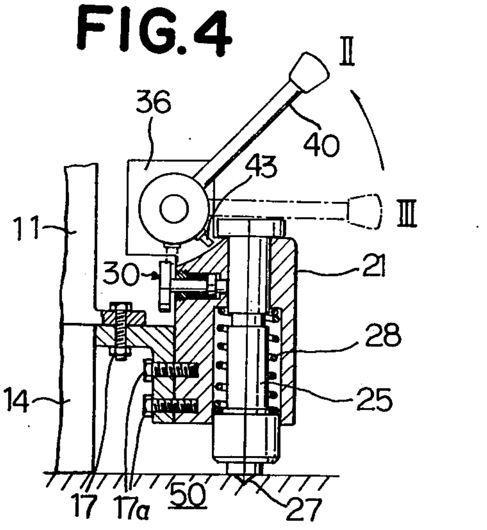
FIG. 4 is similar to FIGS. 1 and 2, but shows the manual lever in an intermediate position between the positions as shown in FIGS. 2 and 3.

At the completion of a particular drilling operation on the work 50, the manual handle 15 is rotated in the direction opposite to the direction of the arrow in FIG. 1 to raise the electric drill 13 and accordingly, the cutter 12 on the drill from the work 50 and thereafter, the manual lever 40 is rotated back from the position III as shown in FIG. 3 to the position II as shown in FIG. 4 whereupon the switch 41 is changed over to turn the electric circuit to the electric drill 13 on to thereby terminate the rotation of the drill leaving the electromagnet 14 in its excited condition. At this time, the pointed projection 27 on the punch 25 also maintains its work biting position. When the manual lever 40 is further rotated by 45° from the position II as shown in FIG. 4 to the position or upright position I as shown in FIG. 1 in the counter-clockwise direction, the switch 41 is changed over to turn the electric circuit to the electromagnet 14 on whereupon the projection 43 on the sleeve 42 engages the engaging head 25' on the punch 25 whereby the punch is raised against the force of the spring 28 and the stop 30 is then urged to advance into the annular recess **25*a* in the punch 25 under the biasing force of the spring 34 to thereby hold the punch 25 in the raised position. Thus, the stand stabilization device 20** returns to the inoperative position.

In the drilling machine stand stabilization device of the present invention, if the electric circuit in the stabilization device is provided with a suitable overload alarming means such as a buzzer or lamp which is adapted to give an warning to the operator when the cutter 12 is subjected to an overload during a drilling operation on the drilling machine, the operator can manipulate the operation handle 15 safely.

As mentioned hereinabove, according to the present invention, since the punch is adapted to oppose a force which generates in the initial stage of a drilling operation and tends to raise the front part of the stand to thereby separate the electromagnet from the work, the drilling operation by the electric drill can be satisfactorily performed with the stand of the drilling machine maintained in the stabilized condition. In addition, by the arrangement in which the pointed projection extending downwardly from the lower end of the punch is caused to bite the work under the action of driving means such as the spring hammer unit, the holding-down force acting on the work and punch in the horizontal direction can be improved whereby the drilling machine stand is prevented from displacing and/or moving about on the work and the cutter attached to the electric drill is protected from possible damage. Thus, the operator can perform the drilling operation with safety.

While a preferred embodiment of the invention has been shown and described in detail, it will be understood that the same is for illustration purposes only and not to be taken as a definition of the invention, reference being had for this purpose to the appended claims.

What is claimed is:

1. An electromagnet base drilling machine comprising: a drilling machine stand; an electromagnet attached to the underside of said stand for attracting an iron workpiece thereto and having a power source circuit; a rotary electric tool mounted on the front portion of said stand for vertical movement thereon and having a rotary cutter rotatably held on the lower end thereof and a power supply circuit; a punch mounted on the rear portion of said stand remote from said electric tool for vertical movement thereon and having a pointed projection extending downwardly from said punch for biting into the upper surface of the workpiece; a horizontal shaft rotatably mounted on said stand and having the rotational axis extending at right angles to the axis of said punch; a manual lever fixed on said horizontal shaft for rotational movement about the shaft from an initial position to first and second rotated positions; a switch to which said shaft is connected, said switch having contact means for, when said manual lever is in the initial position, opening the power source circuit, when said manual lever is in the first rotated position, closing said power source circuit, and when said manual lever is in the second rotated position, closing the power supply circuit for said electric tool while maintaining said electromagnet in the energized state; a stop engagable with said punch and movable for releasing said punch in response to the rotational movement of said manual lever from the first rotated position to the second rotated position; and a spring engaged with said punch for causing said punch to move downwardly to said workpiece upon the release of the punch.

2. The electromagnet base drilling machine as set forth in claim 1, in which said switch is a rotary switch.

3. The electromagnet base drilling as set forth in claim 2, in which the operation shaft for said switch is directly connected to said horizontal shaft.

4. The electromagnet base drilling as set forth in claim 1, in which the operation shaft for said switch is directly connected to said horizontal shaft.

5. The electromagnet base drilling machine as set forth in claim 1, in which said stop is spring-loaded pin.

6. The electromagnet base drilling machine as set forth in claim 1, in which said spring is a compression spring.

* * * * *